(12) United States Patent
Sipple (10) Patent No.: US 10,656,342 B2
(45) Date of Patent: May 19, 2020

(54) OPTICAL WIRELESS ROTARY JOINT (71) Applicant: Halliburton Energy Services, Inc., Houston, TX (US)

(72) Inventor: Michael Kevin Sipple, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/328,414

(22) PCT Filed: Sep. 30, 2016

(86) PCT No.: PCT/US2016/054726
§ 371 (c)(1),
(2) Date: Feb. 26, 2019

(87) PCT Pub. No.: WO2018/063312
PCT Pub. Date: Apr. 5, 2018

(65) Prior Publication Data
US 2019/0196112 A1    Jun. 27, 2019

(51) Int. Cl.
*G01V 1/40* (2006.01)
*H04B 10/80* (2013.01)
(Continued)

(52) U.S. Cl.
CPC .......... *G02B 6/3604* (2013.01); *E21B 17/206* (2013.01); *E21B 47/123* (2013.01);
(Continued)

(58) Field of Classification Search
CPC ....... E21B 17/206; E21B 47/123; G01V 1/40; G02B 6/3604; H04B 10/80; H04B 10/801
See application file for complete search history.

(56) References Cited

U.S. PATENT DOCUMENTS

| 4,842,355 A | 6/1989 | Gold et al. |
| 7,420,475 B2 | 9/2008 | Adnan et al. |

(Continued)

FOREIGN PATENT DOCUMENTS

JP    2007534862    11/2007

OTHER PUBLICATIONS

International Patent Application No. PCT/US2016/054726, "International Search Report and Written Opinion", Jun. 26, 2017, 13 pages.

*Primary Examiner* — Sisay Yacob
(74) *Attorney, Agent, or Firm* — Kilpatrick Townsend & Stockton LLP (57) ABSTRACT

An optical wireless rotary joint can include a first optical device and a second optical device. The first optical device can be coupled to a rotatable component for rotating with the rotatable component. The second optical device can be physically separated from the first optical device. The second optical device can be coupled to a stationary component for communicating data with the first optical device using an optical signal. The first optical device or the second optical device can include an optical transmitter for transmitting the optical signal based on the data. The other of the first optical device or the second optical device can include an optical receiver for generating a new signal in response to detecting the optical signal transmitted by the optical transmitter.

20 Claims, 5 Drawing Sheets

(51) Int. Cl.
  G02B 6/36 (2006.01)
  E21B 17/20 (2006.01)
  E21B 47/12 (2012.01)

(52) U.S. Cl.
  CPC .............. G01V 1/40 (2013.01); H04B 10/80 (2013.01); H04B 10/801 (2013.01)

(56) References Cited

U.S. PATENT DOCUMENTS

| | | | |
|---|---|---|---|
| 8,903,243 | B2 | 12/2014 | Ullah |
| 9,285,547 | B2 * | 3/2016 | Ullah .................... G02B 6/3604 |
| 2004/0141686 | A1 | 7/2004 | Schilling et al. |
| 2005/0034857 | A1 * | 2/2005 | Defretin ................. E21B 47/10 |
| | | | 166/250.01 |
| 2008/0218374 | A1 | 9/2008 | Hagen et al. |
| 2010/0018703 | A1 * | 1/2010 | Lovell ................... E21B 23/002 |
| | | | 166/255.2 |
| 2012/0060615 | A1 * | 3/2012 | Farhadiroushan .. E21B 47/0002 |
| | | | 73/655 |
| 2012/0213525 | A1 * | 8/2012 | Ullah .................... G02B 6/3604 |
| | | | 398/115 |
| 2017/0096892 | A1 * | 4/2017 | Segura Dominguez ...................... |
| | | | E21B 17/206 |
| 2017/0292371 | A1 * | 10/2017 | Hay ...................... E21B 47/124 |

\* cited by examiner

OPTICAL WIRELESS ROTARY JOINT

TECHNICAL FIELD

The present disclosure relates generally to communicating between a rotating component and a stationary component, and more particularly (although not necessarily exclusively), to an optical wireless rotary joint for use in a wellbore environment.

BACKGROUND

A wellbore environment can include an oil or gas wellbore for extracting hydrocarbon fluids from a subterranean formation. A tool can be positioned in the wellbore (i.e. downhole). A tubing (e.g., a coiled tubing) can extend from the tool to a reel positioned at a surface of the wellbore. The reel can rotate to adjust a length of the tubing that extends from the reel, which can adjust the location of the tool in the wellbore. A cable housed in the tubing can include a first end coupled to the tool and a second end coupled to the reel such that the second end of the cable can rotate with the reel.

A stationary device (e.g., a control panel) can be positioned at the surface of the wellbore and can be communicatively coupled to the second end of the cable using an electrical slip ring. An electrical slip ring can be an electromechanical device that allows the transmission of power and electrical signals between a stationary device and a rotating device. In some examples, an electrical slip ring can include a conductive ring coupled to the second end of the cable and rotatable with the reel. The electrical slip ring can also include a conductive brush coupled to the control panel that can remain in contact with the conductive ring as the conductive ring rotates. The electrical slip ring can maintain an electrical pathway between the control panel and the tool regardless of the rotation of the reel.

DETAILED DESCRIPTION

An optical wireless rotary joint is disclosed for communicatively coupling a rotatable component of a well environment and a stationary component of the well environment using optical devices that are physically separated from each other. The optical wireless rotary joint can include a first optical device physically coupled to the rotatable component and a second optical device physically coupled to the stationary component. The optical devices can communicate an optical signal wirelessly with each other. For example, one of the optical devices can include an optical transmitter that can transmit the optical signal. The other optical device can include an optical receiver that can detect the optical signal and generate another signal based on the optical signal.

The first optical device and the second optical device can be positioned, and/or oriented with respect to one another, to maintain an optical communication pathway between one another despite the rotatable component rotating with respect to the stationary component. The optical devices can communicate with one another at various different positions, and/or over a continuous range of different positions, of the rotatable component with respect to the stationary component. The optical devices can be positioned and/or oriented to maintain the optical communication pathway over a full range of movement of the rotatable component with respect to the stationary component. For example, in a coiled tubing application, the rotatable component can include or be coupled to a reel from which a cable (e.g., a copper wire or a fiber optics cable in the coiled tubing) extends to a tool positioned in a wellbore. The stationary component can include a control device for controlling the tool. An optical signal can be communicated between the control device and the tool using the wireless rotary joint despite rotation of the reel relative to the control device.

An optical transmitter can include any light source (e.g., an LED or a laser) for generating an optical signal (e.g., a visible wave, an infrared wave, or an ultra violet wave). An optical receiver can include a photodetector for generating an electrical signal or an optical signal in response to detecting the optical signal from the optical transmitter. Detecting the optical signal and generating a new signal can be more reliable than receiving the optical signal by allowing the optical signal to pass through the optical receiver. In some examples, the optical receiver can be physically separated from the optical transmitter by not physically contacting the optical transmitter. In additional or alternative examples, the optical receiver can be isolated and distinct from the optical transmitter. The optical signal can be attenuated or diffused as it passes through the physical separation. Detecting the optical signal and generating a new signal based on detecting the optical signal can improve signal quality. In some aspects, an optical receiver can be positioned at any angle relative to an optical transmitter.

In some examples, the optical receiver can detect a reflection of the optical signal. A reflection of the optical signal can occur in response to the optical signal impacting a surface. A portion of the optical signal can be absorbed or pass through the surface and another portion of the optical signal can form the reflection of the optical signal. In additional or alternative examples, the optical receiver can detect the optical signal rather than the reflection of the optical signal. The optical receiver can detect a focused or an unfocused optical signal. A focused optical signal can be formed by passing the optical signal through one or more lenses. An unfocused optical signal can be emitted in one or more directions (e.g., light from an LED). An optical transmitter and an optical receiver can be housed in an explosion-proof housing to protect the optical transmitter and the optical receiver from hazardous conditions. In some examples, the housing can prevent gasses from igniting through contact with the optical transmitter. The optical transmitter and the optical receiver can also be surrounded by a housing that limits external sources of light from affecting the communication between the optical transmitter and the optical receiver.

In some examples, the first optical device and the second optical device can be optical transceivers that can each include an optical transmitter and an optical receiver. The optical transmitter in each optical transceiver can transmit an optical signal. The optical receiver in each optical transceiver can generate an electrical signal or an optical signal in response to detecting the optical signal transmitted by the other optical transceiver. One of the optical transceivers can be coupled to the rotatable component and the other optical transceiver can be coupled to the stationary component such that data can be communicated between the rotatable component and the stationary component in either direction.

A wired connection between a stationary component and a rotatable component can be twisted and damaged as the rotatable component rotates. In some examples, an optical wireless rotary joint can wirelessly couple the stationary component to the rotatable component to avoid using wires that can become twisted and damaged. In additional or alternative examples, an optical wireless rotary joint may have no moving mechanical parts and may be less expensive to produce and maintain than other rotary joints. In additional or alternative examples, an optical wireless rotary joint may provide faster and more reliable communication than other rotary joints.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
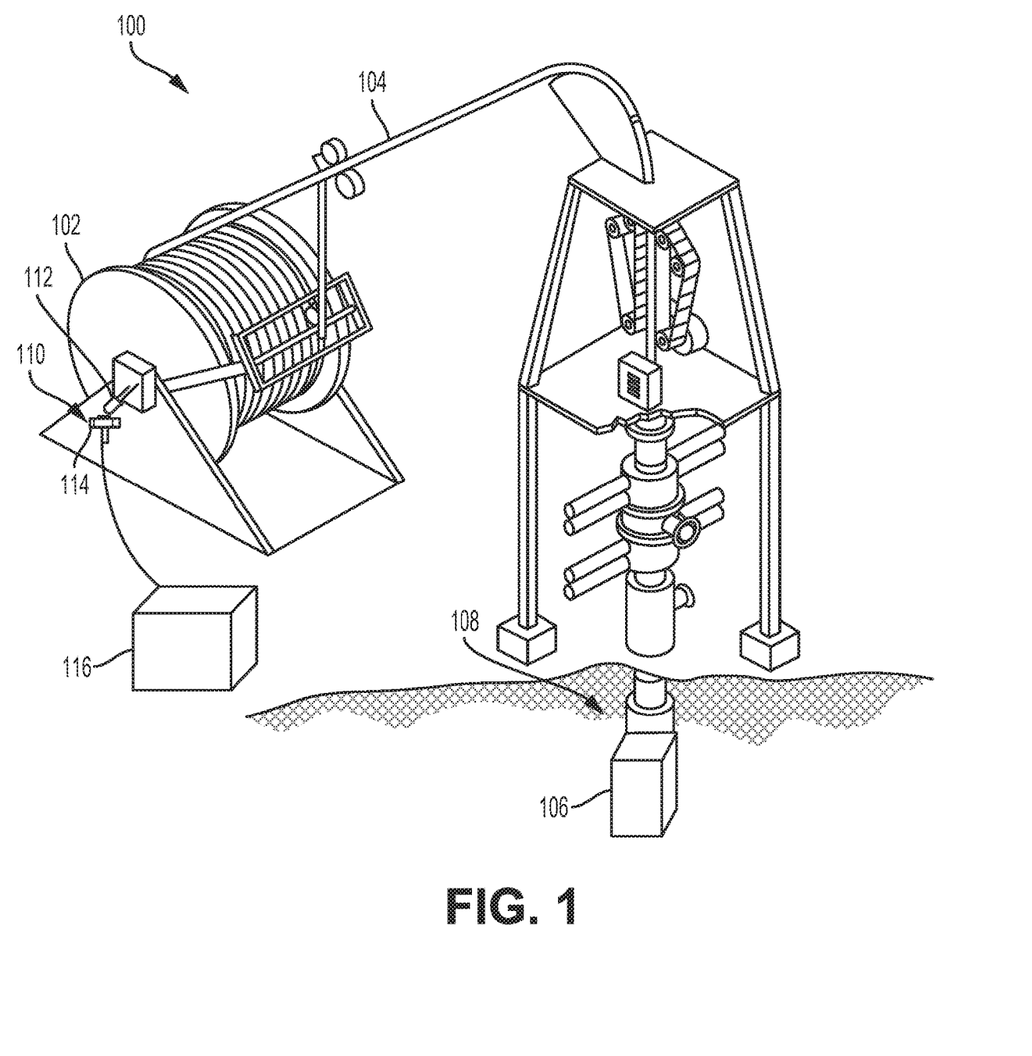
FIG. 1 is a perspective view of a wellbore environment with a wireless optical rotary joint according to one aspect of the present disclosure.

FIG. 1 is a perspective view of a well environment 100 that includes an optical wireless rotary joint 110. The well environment 100 can include a reel 102 for storing a portion of tubing 104. The reel 102 can rotate to adjust a length of the portion of the tubing 104 wrapped around a central axis of the reel 102. The tubing 104 can extend from the reel 102 to a tool 106 positioned in wellbore 108. The tubing 104 can house a communication medium for communicatively coupling to the tool 106. The wellbore 108 can extend through various earth strata and can include a substantially vertical section and a substantially horizontal section. In some examples, a casing string can be cemented to an upper section of the wellbore 108. In additional or alternative examples, the wellbore 108 can be an open-hole environment or can include multiple lateral bores.

The optical wireless rotary joint 110 can include an optical device that includes an optical transmitter 112 and another optical device that includes an optical receiver 114. The optical transmitter 112 can be coupled to the reel 102 and can be communicatively coupled to the tool 106 via the communication medium housed in tubing 104. The optical transmitter 112 can rotate with the reel 102. The optical receiver 114 can be physically separated from the optical transmitter 112 and can remain stationary while the optical transmitter 112 rotates. The optical transmitter 112 can receive data from the tool 106 and transmit an optical signal based on the data to the optical receiver 114.

The optical receiver 114 can be communicatively coupled to a surface device 116. The optical receiver 114 can transmit a signal to the surface device 116 in response to receiving the optical signal from the optical transmitter 112. In some aspects, receiving the optical signal can include detecting the optical signal. For example, the optical receiver 114 can detect the optical signal without allowing the optical signal to pass through a conduit or communication medium included in the optical receiver 114. Rather, the optical receiver 114 can detect the optical signal, generate a new signal based on detecting the optical signal, and transmit the new signal to the surface device 116. The surface device 116 can analyze the signal from the optical receiver 114 to determine the data transmitted by the tool 106 such that the wireless optical rotary joint communicatively couples the tool 106 to the surface device 116.

Although FIG. 1 depicts the optical wireless rotary joint 110 for communicating from the tool 106 to the surface device 116, an optical wireless rotary joint according to other examples can communicate signals from the surface device 116 to the tool 106. For example, an optical wireless rotary joint can include two or more optical device. One of the optical devices can be an optical receiver that rotates with the reel 102. Another optical device can be an optical transmitter that is stationary. In additional or alternative examples, the optical devices can be optical transceivers having both an optical transmitter and an optical receiver for communicating optical signals in both directions. The optical transmitter 112 is depicted as an LED but an optical transmitter can include any light source including, but not limited to, a laser or a light bulb. The optical transmitter 112 can transmit any optical signal (e.g., visible light or infrared). Although the optical transmitter 112 is depicted as rotatable with the central axis of the reel 102, an optical transmitter can be coupled to a reel to rotate around a central axis. In some examples, the optical transmitter 112 can be directly coupled to an end of the tubing 104 by a termination assembly. The termination assembly can communicatively couple the communication medium in the tubing 104 to the optical transmitter 112.

Figure 2:
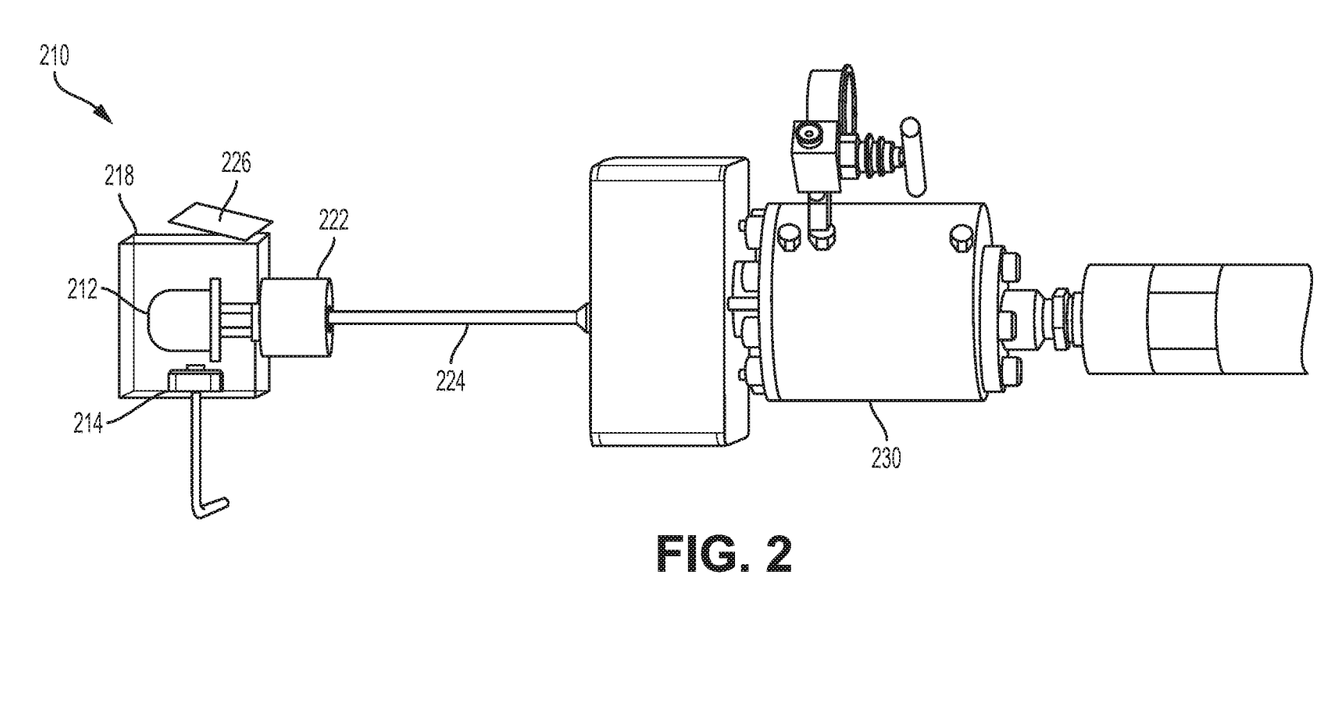
FIG. 2 is a perspective view of a wireless optical rotary joint for transmitting from a rotatable component to a stationary component according to one aspect of the present disclosure.

FIG. 2 is a perspective view of an optical wireless rotary joint 210 for communicating data from a rotatable component to a stationary component. The optical wireless rotary joint 210 can include an optical transmitter 212 and an optical receiver 214. The optical wireless rotary joint 210 can further include a housing 218, an electrical slip ring 222, a cable 224, a solar panel 226, and a termination assembly 230.

The electrical slip ring 222 can allow the optical transmitter to remain stationary while communicatively coupled to the cable 224, which can be rotating with the rotatable component (e.g., a reel as depicted in FIG. 1). The cable 224 can be communicatively coupled to the termination assembly 230 to provide the optical transmitter 212 with power or data from the rotatable component or a tool communicatively coupled to the rotatable component.

The optical transmitter 212 can include any light source and can generate an optical signal based on data from the rotatable component or another device (e.g., a tool positioned in a wellbore) coupled to the rotatable component. The optical signal can be infrared, visible light, ultra violet, or any other light wave. The optical receiver 214 can be physically separated from the optical transmitter 212 and coupled to a stationary component. The optical receiver 214 can detect the optical signal and generate another signal based on the optical signal. In some examples, the optical receiver 214 can detect an unreflected version of the optical signal. An unreflected version of the optical signal can include the original optical signal without having passed through a lens or reflected off a surface. In some examples, the optical signal can be a focused beam of light (e.g., a laser) directed at the optical receiver 214. In additional or alternative examples, the optical signal can be emitted in multiple directions from the optical transmitter 212 and the optical receiver 214 can detect a portion of the optical signal emitted towards the optical receiver 214. The new signal can be based on the frequency, magnitude, or duration of the optical signal. The new signal can be transmitted from the optical receiver to the stationary component such that the rotatable component can communicate with the stationary component.

The termination assembly 230 can be directly coupled to a tubing that extends to a tool positioned in a wellbore. The termination assembly 230 can transmit signals to the optical transmitter 212 via the cable 224. In some examples, the termination assembly 230 can be a fiber optic reel termination assembly ("FORTA") with an integrated optical transceiver for communicatively coupling to an end of a fiber optic cable. A FORTA can seal an end of a tubing that wraps around a reel and communicatively couples to a fiber optic cable that extends through the tubing to a tool positioned in a wellbore. A FORTA can receive information from the tool and transmit instructions to the optical transmitter 212 to transmit an optical signal based on the information. In additional or alternative examples, a termination assembly can be included in the rotatable component and an optical wireless rotary joint can provide communication between the termination assembly and a stationary component.

The cable 224 can rotate with the rotatable component and provide a communication medium between the termination assembly 230 and the optical transmitter 212. In some examples, the electrical slip ring 222 can be used to allow the optical transmitter 212 to remain stationary relative to the rotatable component and still receive power and instructions via cable 224. In other examples, the optical transmitter 212 can be directly coupled to the cable 224 or another part of the rotatable component such that the optical transmitter 212 can rotate with the rotatable component.

The solar panel 226 can be coupled to the optical transmitter 212 to provide the optical transmitter 212 with power. Rechargeable batteries can also be coupled to the solar panel 226 to be charged by the solar panel 226 and coupled to the optical transmitter 212 to provide power when solar power is unavailable. The solar panel 226 can include more than one solar panel. In some examples, more than one solar panel can be positioned around the optical transmitter 212. The solar panels can be coupled to remain stationary or to rotate with an optical transmitter that is rotatable with the rotatable component. In some examples, an optical transmitter can be communicatively coupled to a generator that provides power to the optical transmitter based on the rotation of the rotatable component.

The housing 218 can surround the optical transmitter 212 and optical receiver 214. The housing 218 can reduce noise affecting the optical receiver 214. For example, the housing 218 can be made of an opaque material that blocks optical signals of a similar frequency to the optical signals generated by the optical transmitter. The housing 218 can block the optical signals from entering inner area of the housing 218 and reduce the noise detected by the optical receiver 214. The housing 218 can protect the optical wireless rotary joint 210 by limiting contact between the optical transmitter 212 and hazardous gasses present in the environment. For example, the housing 218 can prevent flammable gasses from being ignited due to contact with the optical transmitter 212.

Figure 3:
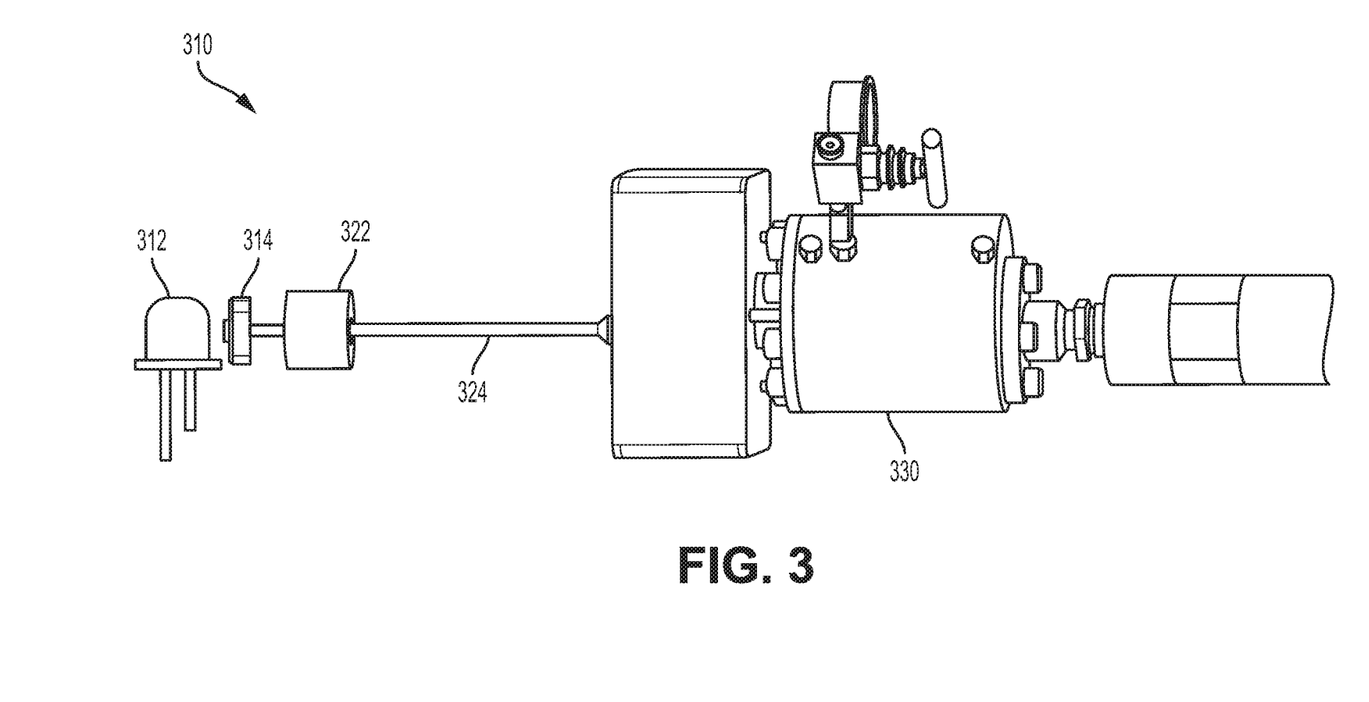
FIG. 3 is a perspective view of a wireless optical rotary joint for transmitting from a stationary component to a rotatable component according to one aspect of the present disclosure.

FIG. 3 is a perspective view of an optical wireless rotary joint 310 for communicating data from a stationary component to a rotatable component. The optical wireless rotary joint 310 can include an optical transmitter 312 and an optical receiver 314. The optical wireless rotary joint 310 can further include the electrical slip ring 222, the cable 224, and the termination assembly 230. The optical receiver 314 can be coupled to the electrical slip ring 222, which can be coupled to the cable 224, which can be coupled to the termination assembly 230, which can couple to the rotatable component (e.g., a reel as depicted in FIG. 1). The optical transmitter 312 can be coupled to a stationary component.

The optical transmitter 312 can generate an optical signal in response to receiving a signal from the stationary component. The optical receiver 314 can be a photodiode for generating a new signal based on detecting the optical signal and transmit the new signal to the rotatable component or a device coupled to the rotatable component. In some examples, the optical wireless rotary joint 310 can be used to allow a control unit to communicate with a tool positioned in a wellbore and coupled to a rotating reel. In some aspects, the optical receiver 314 may not include a conduit for allowing an optical signal to propagate therethrough. For example, the optical receiver 314 can be solid for absorbing a portion of the optical signal and converting the energy of the portion of the optical signal into an electrical signal.

Figure 4:
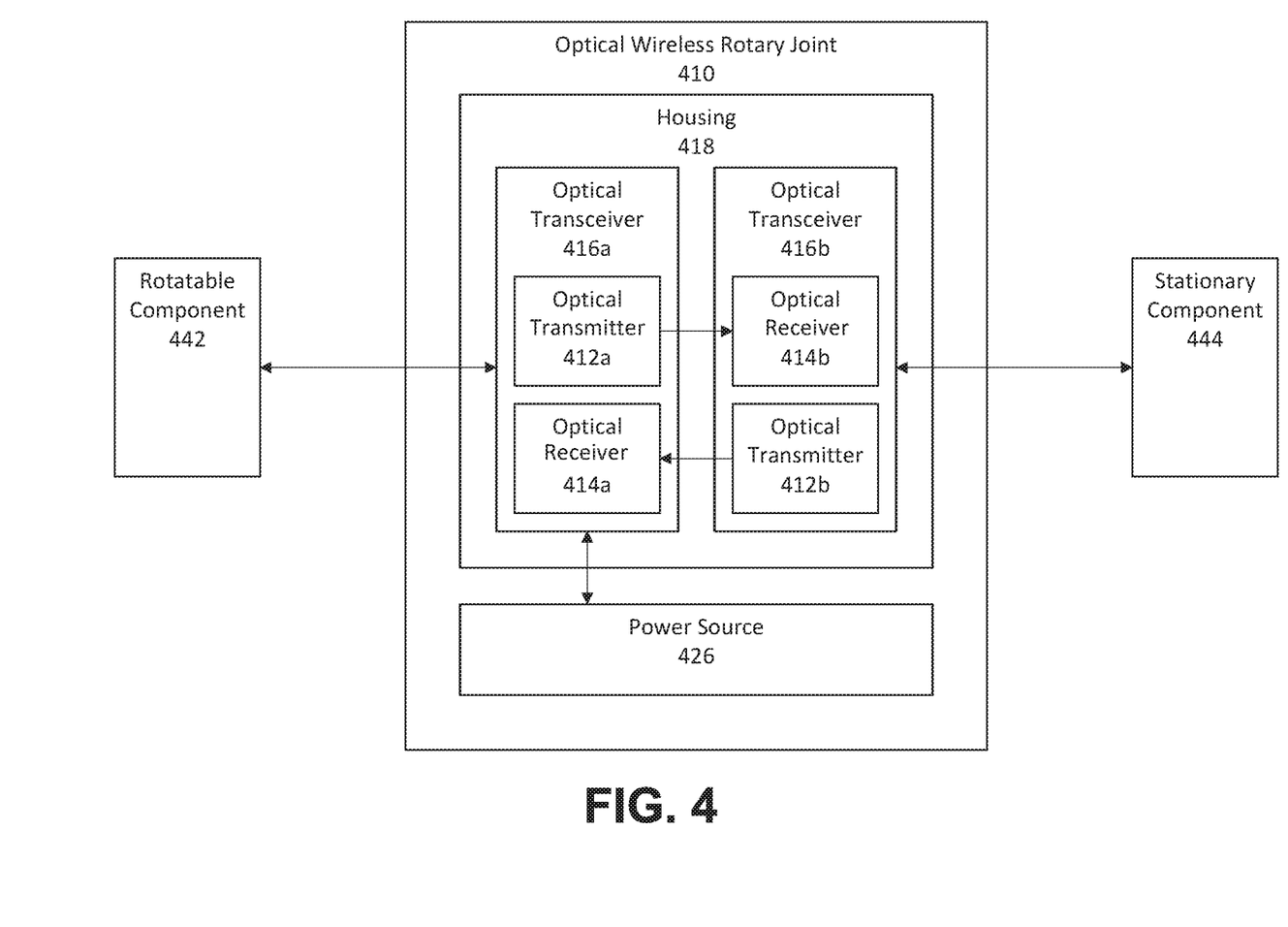
FIG. 4 is a block diagram of a wireless optical rotary joint according to one aspect of the present disclosure.

Although FIG. 2 and FIG. 3 each depict an optical wireless rotary joint 210, 310 having two optical devices for communicating in a single direction, an optical wireless rotary joint can provide communication in both directions. FIG. 4 is a block diagram of an optical wireless rotary joint 410 that can provide a communication path in both directions between a rotatable component 442 and a stationary component 444. The optical wireless rotary joint 410 can include two optical transceivers 416a-b, a housing 418, and a power source 426. Each optical transceiver 416a-b can include an optical transmitter 412a-b and an optical receiver 414a-b. The optical transceiver 416a can be coupled to the rotatable component 442 and the optical transceiver 416b can be coupled to the stationary component 444. The optical transmitter 412a can transmit an optical signal that can be detected by the optical receiver 414b such that the rotatable component 442 can communicate information to the stationary component 444. The optical transmitter 412b can transmit an optical signal that can be detected by optical receiver 414a such that stationary component 444 can communicate information to the rotatable component 442.

In some examples, the optical wireless rotary joint 410 can allow data to be communicated between the rotatable component 442 and the stationary component 444 by receiving the data, transmitting an optical signal based on the data, generating a new signal based on detecting the optical signal, and analyzing the new signal to determine the data. A processing device can be included in (or communicatively coupled to) an optical transceiver 416a-b for controlling the optical transmitter 412a-b. For example, the processing device can receive the data and activate the optical transmitter to generate an optical signal modulated with the data. The optical transmitter 412a-b can include a laser that generates an optical signal focused in a specific direction. The optical transmitter 412a-b can include one or more lenses for directing the optical signal towards the optical receiver 414a-b. In additional or alternative examples, the optical transmitter 412a-b can include an LED or another light source for emitting an optical signal in multiple directions. In some examples, the processing device can also analyze a modulated optical signal detected by the optical receiver 414a-b to determine the data. The optical receiver 414a-b can absorb a portion of the optical signal and generate an electrical signal based on the portion absorbed.

The housing 418 can surround the optical transceivers 416a-b to protect the optical transceivers 416a-b from hazardous conditions. The housing 418 can also surround the optical transceivers 416a-b to limit background noise (e.g., external light). The power source 426 can be coupled to the optical transceiver 416a to provide power to the optical transmitter 412a or optical receiver 414a. The power source 426 can be coupled to the optical transceiver 416a such that the power source 426 rotates with the rotatable component 442. In some examples, the power source 426 can include solar panels and a rechargeable battery. In additional or alternative examples, the power source 426 can include a battery capable of powering the optical transceiver 416a for a lifetime of the optical transceiver 416a. The power source 426 can also be a generator for providing power based on the rotation of the rotatable component 442.

The rotatable component 442 can be any device or portion of a device that rotates. For example, the rotatable component 442 can be a reel for use in a well environment, a turntable used for rotating a satellite dish, or a propeller for a wind turbine. The stationary component 444 can be any device or portion of a device that maintains its orientation relative to the rotatable component 442. In some examples, the stationary component 444 can be a control unit for controlling the rotatable component 442 or for controlling a tool coupled to the rotatable component 442. In additional or alternative examples, the stationary component 444 can be a processing device for analyzing data received from the rotatable component 442 or a tool coupled to the rotatable component 442.

Figure 5:
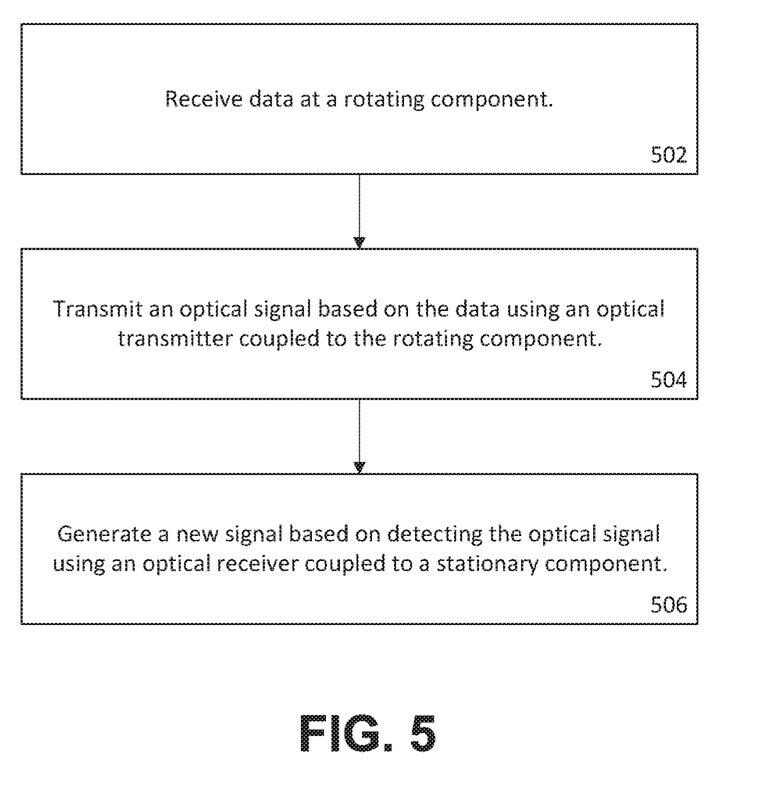
FIG. 5 is a flow chart of a process for communicating data using an optical wireless rotary joint.

FIG. 5 is a flow chart of a process for transmitting data from a rotating component to a stationary component using an optical wireless rotary joint. The optical wireless rotary joint can prevent the use of a communication medium between the rotating component and the stationary component, which can be twisted or damaged.

In block 502, data is received at a rotating component. The rotating component can be a coiled tubing reel for allowing a segment of coiled tubing to wrap around a central axis (e.g., a longitudinal axis) of the reel. The coiled tubing can extend from the reel into a wellbore and can couple to a tool positioned in the wellbore. In other examples, the rotating component can be a wireline reel for allowing a segment of a wireline to wrap around a central axis of the reel.

The tool can generate the data (e.g., by taking measurements of the surrounding formation). The tool can transmit the data, as part of a modulated signal, to the rotating component using a communication medium (e.g., fiber optic cable housed in a coiled tubing extending from the tool to a reel). The signal can be received by an optical device coupled to, and rotating with, the rotating component. The optical device can include a processing device for determining the data from the signal.

In block 504, an optical signal can be transmitted based on the data using an optical transmitter coupled to the rotating component. The optical transmitter can be any light source (e.g., an LED or a laser). The optical device can instruct the light source to transmit the data as a light wave or a series of light waves that include the data. The light source can produce an unfocused optical signal that does not pass through any lenses. In some aspects, the light source can be coupled to the rotating component by an electrical slip ring such that the light source is stationary and receives power from the rotating component. In additional or alternative aspects, the light source can be coupled to a solar panel for receiving power.

In block 506, a new signal can be generated based on detecting the optical signal by a physically separated optical receiver coupled to a stationary component. In some examples, the optical receiver can include a photodetector for absorbing portion of the optical signal transmitted directly from the optical transmitter. The photodetector can produce an electrical signal based on detecting the optical signal. The optical receiver can be communicatively coupled to (or included in) another optical device. The optical device can include a processing device for determining the data from the detected optical signals. The optical receiver and the optical transmitter can be shielded from noise (e.g., light from other sources) by a housing. The housing can include an opaque material for limiting the light waves that can pass through the opaque material.

The new signal can be used to further transmit the data to the stationary component. The new signal can be a modulated electrical signal, a wireless signal, or an optical signal. In some aspects, data from a tool positioned in the wellbore can be used by the stationary component to determine information about the tool or the formation surrounding the tool.

Although FIG. 5 depicts a process for transmitting data from a rotating component to a stationary component, a similar process can be used to transmit data from a stationary component to a rotating component. For example, a stationary component can receive data. An optical signal based on the data can be transmit using an optical transmitter coupled to the stationary component. And, another signal can be generated based on detecting the optical signal by a physically separated optical receiver coupled to a rotating component.

In some aspects, an optical wireless rotary joint is provided according to one or more of the following examples:

Example #1

An apparatus can include a first optical device and a second optical device. The first optical device can be coupled to a component that can rotate for rotating with the component. The second optical device can be physically separated from the first optical device. The second optical device can be coupled to a stationary component for communicating data with the first optical device using an optical signal. The first optical device or the second optical device can device can include an optical receiver for generating a new signal in response to detecting the optical signal transmitted by the optical transmitter.

Example #2

The apparatus of Example #1 can feature the first optical device including the optical transmitter. The component that can rotate can be a reel that can rotate to advance or retract a tubing that extends from the reel to a tool in a wellbore. The tubing can house a communication medium for communicatively coupling the tool and the first optical device. The second optical device can include the optical receiver, which can include a photodetector. The first optical device and the second optical device can form an optical wireless rotary joint for allowing the tool to communicate the data with the stationary component.

Example #3

The apparatus of Example #2 can feature the photodetector being communicatively coupled to the optical transmitter for generating the new signal in response to detecting the optical signal or a reflection of the optical signal. The new signal can be modulated to include the data.

Example #4

The apparatus of Example #2 can feature the photodetector being communicatively coupled to the optical transmitter for absorbing a portion of the optical signal or a reflection of the optical signal and generating an electrical signal based on absorbing the portion.

Example #5

The apparatus of Example #2 can feature the second optical device being communicatively coupled to the first optical device for communicating the data using an unreflected version of the optical signal.

Example #6

The apparatus of Example #1 can feature the first optical device including the optical receiver, which can include a photodetector. The component that can rotate can be a reel that can rotate to advance or retract a cable that can be communicatively coupled between the first optical device and a tool positioned in a wellbore. The second optical device can include the optical transmitter. The first optical device and the second optical device can form an optical wireless rotary joint for allowing the tool to communicate the data with the stationary component.

Example #7

The apparatus of Example #1 can feature the optical signal being a first optical signal having a frequency within a range of values. The apparatus can further include a housing for surrounding the first optical device and the second optical device. The housing can include a material for preventing a second optical signal having a frequency within the range of values from entering the housing.

Example #8

The apparatus of Example #1 can further include a solar panel coupled to the first optical device for rotating with the first optical device and communicatively coupled to the first optical device for providing power to the first optical device.

Example #9

A system can include a tool, a tubing, a reel that can rotate, a first optical device, and a second optical device. The tool can be positioned in a wellbore. The tubing can be coupled to the tool for housing a communication medium communicatively coupled to the tool. The reel can be coupled to the tubing. The first optical device can be coupled to the reel for rotating with the reel. The first optical device can also be communicatively coupled to the tool by the communication medium housed in the tubing. The second optical device can be physically separated from the first optical device and coupled to a stationary component for remaining stationary relative to the first optical device and for communicating data with the first optical device using an optical signal. The first optical device or the second optical device can include an optical transmitter for transmitting the optical signal based on the data. The other of the first optical device or the second optical device including an optical receiver for generating a new signal in response to detecting the optical signal transmitted by the optical transmitter.

Example #10

The system of Example #9 can feature the first optical device including the optical transmitter for generating the optical signal. The second optical device can include the optical receiver that can include a photodetector. The first optical device and the second optical device can form an optical wireless rotary joint to allow the tool to communicate the data to the stationary component using the optical signal.

Example #11

The system of Example #10 can feature the optical transmitter being communicatively coupled to the tool for receiving the data from the tool and for generating the optical signal based on the data. The new signal can be an electrical signal and the second optical device can be communicatively coupled to the stationary component for generating the electrical signal based on the photodetector detecting the optical signal or a reflection of the optical signal.

Example #12

The system of Example #10 can feature the first optical device further including an electrical slip ring for allowing the optical transmitter to remain stationary and receive power from the reel.

Example #13

The system of Example #10 can feature the first optical device further including a solar panel coupled to the first optical device for rotating with the first optical device and for providing power to the optical transmitter.

Example #14

The system of Example #9 can feature the first optical device including the optical receiver that can include a photodetector. The second optical device can include the optical transmitter. The first optical device and the second optical device form an optical wireless rotary joint to allow the stationary component to communicate the data to the tool using the optical signal.

Example #15

The system of Example #9 can feature the optical signal being a first optical signal having a frequency within a range of values. The system can further include a housing for surrounding the first optical device and the second optical device. The housing can include a material for preventing a second optical signal having a frequency within the range of values from entering the housing.

Example #16

A method can include receiving data from a tool positioned in a wellbore at a reel that is rotating to adjust a length of a portion of tubing extending from the reel to the tool. The method can further include transmitting an optical signal based on the data using a first optical device coupled to the reel. The first optical device can be rotating with the reel. The method can further include generating a new signal based on detecting the optical signal using a second optical device that is coupled to a stationary device and physically separated from the first optical device.

Example #17

The method of Example #16 can feature the first optical device including an optical transmitter. The second optical device can include an optical receiver that includes a photodetector. Transmitting the optical signal can include activating the optical transmitter to generate the optical signal. Generating the new signal can include generating an electrical signal in response to a photodetector detecting the optical signal and transmitting the electrical signal to the stationary device that is communicatively coupled to the second optical device.

Example #18

The method of Example #17 can feature generating the new signal further including detecting the optical signal directly from the optical transmitter. The optical transmitter can be physically separated from the photodetector.

Example #19

The method of Example #17 can feature transmitting the optical signal further including using a light source to generate an unfocused optical signal that does not pass through the optical receiver.

Example #20

The method of Example #16, can feature the data being first data. The optical signal can be a first optical signal. The first optical device can include an optical receiver and the second optical device can include an optical transmitter. The method can further include receiving second data from the stationary device at the second optical device. The method can further include transmitting the second optical signal based on the second data using the second optical device. The method can further include generating another optical signal based on detecting the second optical signal using the first optical device.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. An apparatus comprising:
a first optical device coupleable to a rotatable reel that is rotatable to advance or retract a tubing extendable from the rotatable reel to a tool in a wellbore; and
a second optical device physically separated from the first optical device and coupleable to a stationary component for communicating data with the first optical device using an optical signal, the first optical device or the second optical device including an optical transmitter for transmitting the optical signal based on the data, and the other of the first optical device or the second optical device including a photodetector for generating a new signal in response to detecting the optical signal transmitted by the optical transmitter, wherein the first optical device and the second optical device form an optical wireless rotary joint for allowing the tool to communicate the data with the stationary component.

2. The apparatus of claim 1, wherein the first optical device includes the optical transmitter and wherein the second optical device includes the photodetector.

3. The apparatus of claim 2, wherein the photodetector is communicatively coupled to the optical transmitter for generating the new signal in response to detecting the optical signal or a reflection of the optical signal, the new signal being modulated to include the data.

4. The apparatus of claim 2, wherein the photodetector is communicatively coupled to the optical transmitter for absorbing a portion of the optical signal or a reflection of the optical signal and generating an electrical signal based on absorbing the portion.

5. The apparatus of claim 2, wherein the second optical device is communicatively coupled to the first optical device for communicating the data using an unreflected version of the optical signal.

6. The apparatus of claim 1, wherein the first optical device includes the photodetector and wherein the second optical device includes the optical transmitter.

7. The apparatus of claim 1, wherein the optical signal is a first optical signal having a first frequency within a range of values, the apparatus further comprising a housing for surrounding the first optical device and the second optical device, the housing comprising a material for preventing a second optical signal having a second frequency within the range of values from entering the housing.

8. The apparatus of claim 1, further comprising a solar panel coupled to the first optical device for rotating with the first optical device and communicatively coupled to the first optical device for providing power to the first optical device.

9. A system comprising:
a tool positionable in a wellbore;
a tubing coupleable to the tool for housing a communication medium communicatively coupleable to the tool;
a rotatable reel coupleable to the tubing;
a first optical device coupled to the rotatable reel for rotating with the rotatable reel and communicatively coupling to the tool by the communication medium housed in the tubing; and
a second optical device physically separated from the first optical device and coupled to a stationary component for remaining stationary relative to the first optical device and for communicating data with the first optical device using an optical signal, the first optical device or the second optical device including an optical transmitter for transmitting the optical signal based on the data, and the other of the first optical device or the second optical device including a photodetector for generating a new signal in response to detecting the optical signal transmitted by the optical transmitter, wherein the first optical device and the second optical device form an optical wireless rotary joint to allow the tool to communicate the data to the stationary component using the optical signal.

10. The system of claim 9, wherein the first optical device comprises the optical transmitter and the second optical device comprises the photodetector.

11. The system of claim 10, wherein the optical transmitter is communicatively coupled to the tool for receiving the data from the tool and for generating the optical signal based on the data, wherein the new signal is an electrical signal and the second optical device is communicatively coupled to the stationary component for generating the electrical signal based on the photodetector detecting the optical signal or a reflection of the optical signal.

12. The system of claim 10, wherein the first optical device further comprises an electrical slip ring for allowing the optical transmitter to remain stationary and receive power from the rotatable reel.

13. The system of claim 10, wherein the first optical device further comprises a solar panel coupled to the first optical device for rotating with the first optical device and for providing power to the optical transmitter.

14. The system of claim 9, wherein the first optical device comprises the photodetector and the second optical device comprises the optical transmitter.

15. The system of claim 9, wherein the optical signal is a first optical signal having a first frequency within a range of values, the system further comprising a housing for surrounding the first optical device and the second optical device, the housing comprising a material for preventing a second optical signal having a second frequency within the range of values from entering the housing.

16. A method comprising:
receiving data from a tool positioned in a wellbore at a reel that is rotating to adjust a length of a portion of tubing extending from the reel to the tool;
transmitting an optical signal based on the data using an optical transmitter coupled to the reel, the optical transmitter rotating with the reel; and
generating a new signal based on detecting the optical signal using a photodetector coupled to a stationary device and physically separated from the optical transmitter;
wherein the optical transmitter and the photodetector form an optical wireless rotary joint to allow the tool to communicate the data to the stationary device using the optical signal.

17. The method of claim 16, wherein the new signal comprises generating an electrical signal in response to the photodetector detecting the optical signal and transmitting the electrical signal to the stationary device that is communicatively coupled to the photodetector.

18. The method of claim 17, wherein generating the new signal comprises detecting the optical signal directly from the optical transmitter, wherein the optical transmitter is physically separated from the photodetector.

19. The method of claim 17, wherein transmitting the optical signal comprises using a light source to generate an unfocused optical signal that does not pass through the photodetector.

20. The method of claim 16 further comprising:
receiving second data from the stationary device at the photodetector;
transmitting a second optical signal based on the second data using the photodetector; and
generating another signal based on detecting the second optical signal using the optical transmitter.

* * * * *